United States Patent [19]

Sokol et al.

[11] 4,131,083
[45] Dec. 26, 1978

[54] BIRD UNIT

[76] Inventors: John J. Sokol; Florence L. Sokol, both of 15 Robin Hood Dr., DeLand, Fla. 32720

[21] Appl. No.: 776,379

[22] Filed: Mar. 10, 1977

[51] Int. Cl.² .............................................. A01K 39/04
[52] U.S. Cl. .................................. 119/51.5; 119/52 R
[58] Field of Search ..................... 119/52 R, 52 A, 53, 119/54, 51.5, 51 R

[56] References Cited

U.S. PATENT DOCUMENTS

| | | | |
|---|---|---|---|
| 1,144,157 | 6/1915 | Stroup | 119/52 R |
| 2,591,459 | 4/1952 | Meany | 119/52 R |
| 2,715,386 | 8/1955 | Jones | 119/51.5 |
| 3,090,354 | 5/1963 | Merritt et al. | 119/52 R |
| 3,788,279 | 1/1974 | Boehland, Jr. | 119/52 R |

Primary Examiner—Jay N. Eskovitz

[57] ABSTRACT

A two-section bird-feeder unit mounted vertically on a support pole (portions of which support pole include a fill tube as hereinafter described, a reducing slip coupling as hereinafter described, and an oblong square brace suspending a catch jar as hereinafter described). The upper section of said unit is comprised of a dome having a vertically projecting peripheral edge forming a channel reservoir to hold a supply of drinking water for birds, a seed reservoir within the dome with dispensing openings to a seed hopper below, an open-topped fill tube extending above the dome through the seed reservoir with dispensing openings thereto and terminating below the feed hopper at a reducing slip coupling, said fill tube and seed reservoir being sometimes encompassed within a removable funnel attachable beneath the dome and flaring outwardly and downwardly to permit restriction of feed access to small birds, and, finally, a guide funnel with an open top extending outwardly below the outer limits of the feed hopper and flaring downwardly and inwardly to the reducing slip coupling, thereby directing waste seed and seed shells to said reducing slip coupling for its preservation and ultimate re-use. The lower section of said bird-feeder unit being comprised of an oblong square brace connected to the support pole and suspending a removable catch jar attached to the reducing slip coupling for the purpose of storing waste seed and seed shells until their re-use.

1 Claim, 1 Drawing Figure

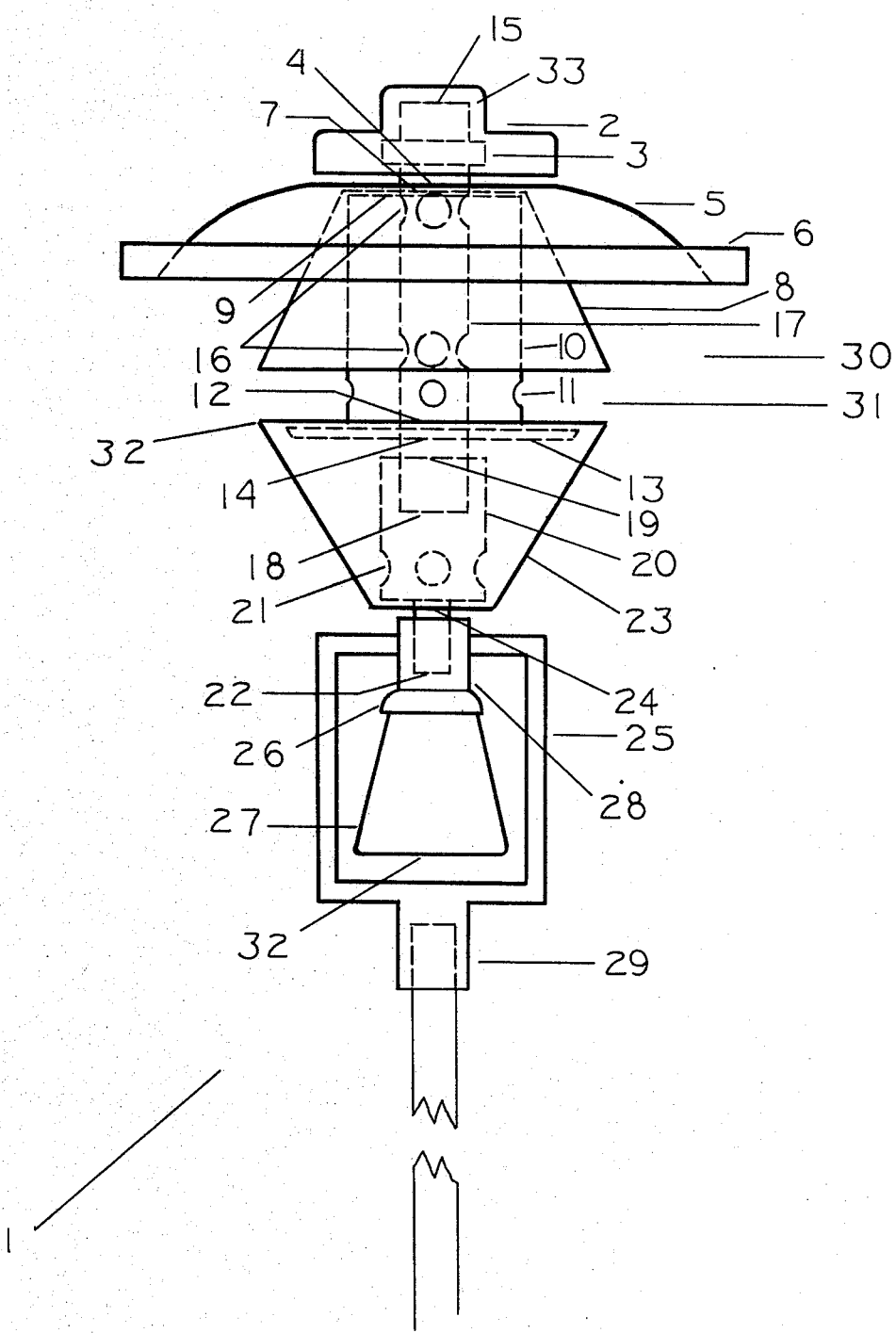

BIRD UNIT

Considering the fact that birds erratically peck while feeding, seeds that are flicked out of hopper, as well as shucked seed shells, fall to the ground beneath a bird feeder and because of various conditions that prevail, the seeds and shells either become embedded in grass, in sand, are washed away by rain, and/or etc., the seeds are not consumed by birds, therefore go to waste.

Considering the fact that a bird feeder is usually dominated by large birds that won't allow small birds to feed.

Considering the fact that water is not always available, near a bird feeder, for birds to drink.

Considering the fact that a supply of seeds must be made available for birds.

Therefore, the object of the invention is to provide a reservior to hold a supply of drinking water for birds.

Another object of the invention is to provide a means by which the bird unit holds and dispenses a supply of seeds for birds.

Still another object of the invention is to provide a means by which the feeding entrance of bird unit can be narrowed for the purpose of restraining large birds thus restricting bird unit to small birds.

Another object of the invention is to provide a means by which seed waste is avoided.

These objects of the invention should be appreciated from the detailed specification taken in conjunction with the drawing showing a front view of the bird unit part of which is broken away and in section.

Reference numeral 1 generally refers to the bird unit having a fill tube 17 restricted at bottom end 18 with open end 15 which enables seed reservoir 10 to be filled through open end 15 of fill tube 17 and through four holes 16 arranged equiangularly around top portion of fill tube 17. Four holes 16 arranged equiangularly around lower portion of fill tube 17 allows seeds to be drained out of fill tube 17 through four holes 16 in lower portion of fill tube 17 into seed reservoir 10.

Seed reservoir 10 with open top 9 and center hole 12 has four holes 11 arranged equiangularly therearound which enables seeds to be dispensed through holes 11 from seed reservoir 10 into hopper 13 with center hole 14.

Dome 5 with center hole 4 has rimmed channel reservoir 6 that holds a supply of water. When dome 5 is in place without restraint funnel 8 it incloses top 9 of seed reservoir 10 and allows feeding entrance 30 of bird unit 1 to measure four inches. When restraint funnel 8 with center hole 7 is in place beneath dome 5 it incloses top 9 of seed reservoir 10 and narrows feeding entrance 30 of bird unit 1 to feeding entrance 31 which measures one and one half inches.

A reducing slip coupling 20 with open top 19 and open bottom 22 with four holes 21 arranged equiangularly therearound that allow seeds and shells that fall in guide funnel 23 to fall through holes 21 and open bottom 22 of reducing slip coupling 20 through bird unit 1 mounting slip coupling 28 into catch jar 27. Outer rim 32 of guide funnel 23 with center hole 24 also serves as a perch.

Cover slip cap 2 incloses open end of fill tube 17.

Snug fitting slip ring 3 when fitted around extended portion 33 of fill tube 17 and pressed down in place on top of dome 5 holds assembled bird unit 1 together.

Oblong square braces 25 affixed to sides of pole mounting slip coupling 29 and to sides of bird unit 1 mounting slip coupling 28 with affixed screw cap 26 that holds catch jar 27 suspended in center of oblong square brace 25 when catch jar 27 is screwed into affixed screw cap 26. Small water drain holes in bottom 32 of catch jar 27.

In making the assembled bird unit 1 available to birds it first has to be mounted on a suitably anchored pole by embeding end of pole into pole mounting slip coupling 29. After bird unit 1 is in place remove cover slip cap 2 fill seed reservoir 10 to capacity through open end 15 of fill tube 17 then replace cover slip cap 2. Fill rim channel reservoir 6 of dome 5 with water and re-fill when necessary.

When birds peck and shuck seeds, seeds as well as shells fall in guide funnel 23 which then are guided and deposited in catch jar 27. When catch jar 27 becomes approximately nine-tenths full unscrew from affixed screw cap 26 and empty contents into seed reservior 10 by the above way mentioned. Screw catch jar 27 back on affixed screw cap 26. By re-filling seed reservoir 10 from catch jar 27 containing seeds and shells, the birds peck and disgard the shells but shuck and comsume the seeds that otherwise would of fallen to the ground and gone to waste. Keep re-cycling contents of seeds and shells that are continually deposited in catch jar 27 as birds feed until catch jar 27 contains approximately ninty eight percent (or more) shells, then disgard contents in trash can. Each time contents from catch jar 27 is emptied in trash can, add new seeds to seed reservoir 10. The re-cycling of contents from catch jar 27 through bird unit 1 will result in ninty eight percent (or more) of seeds deposited in seed reservoir 10 of bird unit 1 from a bag of seeds will be consumed by birds, thus avoiding the waste of seed.

If large birds are dominating bird unit 1 preventing access to small birds, remove cover slip cap 2 slip ring 3 and dome 5 then proceed to guide center hole 7 of restraint funnel 8 over extended portion 33 of fill tube 17 downward until restraint funnel 8 rest on open top 9 of seed reservoir 10. Then replace dome 5 slip ring 3 and cover slip cap 2. When restraint funnel 8 is in place beneath dome 5 feeding entrance 30 is narrowed to feeding entrance 31 measuring one and one half inches. This narrow feeding entrance restrains large birds from landing on feeding entrance 31 to gain access to seeds, thus discouraging large birds from dominating bird unit 1. Therefore, small birds who have no difficulty landing on narrow feeding entrance 31 will have access to seeds.

Having thusly described our invention, we claim:

1. A bird unit comprising:
   a. a dome having an upwardly projecting peripheral edge forming a channel reservoir to hold a supply of drinking water for birds,
   b. a removable restraint funnel attachable beneath said dome and flaring outwardly and downwardly to restrict access to feed small birds,
   c. a seed reservoir with dispensing openings and a hopper therebeneath, said reservoir being located within said dome and restraint funnel,
   d. a fill tube having an open top which extends above said dome and access holes within said seed reservoir and terminating below said hopper in a reducing slip coupling,
   e. a guide funnel flaring downwardly and inwardly and attached at its bottom to said reducing slip coupling, said guide funnel having an open top with the top rim extending outwardly beyond the outer extent of the hopper to thereby direct waste seed downwardly and inwardly to said reducing slip coupling, f. a catch jar removably attached to said reducing slip coupling,
g. an oblong square brace connected to a pole and suspending said catch jar therewithin, and
h. a removable cap supported on said fill tube.

* * * * *